L. PRAHAR.
Clasp for Pocket-Book.

No. 202,755. Patented April 23, 1878.

WITNESSES:
H. Rydquist.
J. H. Scarborough.

INVENTOR:
L. Prahar.
BY Munn & Co
ATTORNEYS.

UNITED STATES PATENT OFFICE.

LOUIS PRAHAR, OF NEW YORK, N. Y.

IMPROVEMENT IN CLASPS FOR POCKET-BOOKS.

Specification forming part of Letters Patent No. 202,755, dated April 23, 1878; application filed October 6, 1877.

*To all whom it may concern:*

Figure 1:
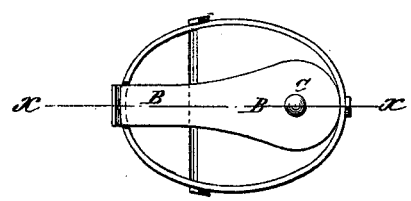
Figure 2:
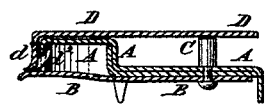
Figure 3:
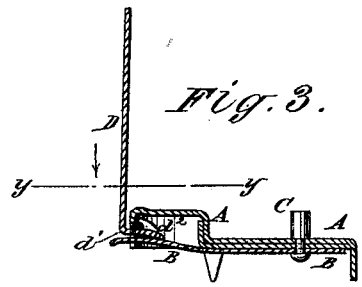
Figure 4:

Be it known that I, LOUIS PRAHAR, of the city, county, and State of New York, have invented a new and useful Improvement in Fasteners for Pocket-Books, &c., of which the following is a specification:

Figure 1 is an under-side view of my improved fastener. Fig. 2 is a longitudinal section of the same closed, taken through the line $xx$, Fig. 1. Fig. 3 is the same section as Fig. 2, but showing the fastener open. Fig. 4 is a cross-section of the top plate.

Similar letters of reference indicate corresponding parts.

The object of this invention is to furnish an improved fastener for pocket-books and other uses, which shall be so constructed that it may be conveniently put together after being plated without any danger of marring the plating, which cannot become detached accidentally, and which shall be simple in construction and inexpensive in manufacture.

The invention will first be described in connection with the drawing, and then pointed out in the claim.

A is the base or under plate, which has points formed upon its edges for securing it to the pocket-book or other object, and has an upward offset formed in its rear part to form a recess or chamber to receive the spring B. The spring B is secured to the bottom of the plate A by the stud C, and its free end projects across the recess in said plate and enters a notch in the flange formed around said recessed rear end.

D is the top or cap plate, which, when closed down, rests upon the offset of the plate A and the end of the stud C. Upon the rear end of the plate D is formed a tail, $d^1$, the end of which rests upon the spring B, so that the said spring B may hold the said plate securely both when closed, as shown in Fig. 2, and when opened, as shown in Fig. 3.

Upon the side edges of the tail $d^1$ are formed hooks $d^2$, which hook upon the flange of the plate A at the bottom of the notch in said flange.

With this construction the fastener is put together by pressing the point of the tail $d^1$ between the spring B and the edge of the flange of the plate A until the hooks $d^2$ pass the flange of the plate A, and the fastener is completed and cannot come apart, the hooks $d^2$ catching upon the flange of the plate A whatever position the plate D may have.

I am aware that the cap-plate of a pocket-book fastener has been heretofore provided with a tail, having lateral projections or ears, and spring-held in the supporting-plate; but this will not allow the two parts to be sprung together, it being necessary to turn the spring to one side before the tail can be entered. This causes the spring to work loosely, often to drop out, and to require much more time in the manufacture. By forming hooks on the edges, and not extending laterally beyond them, but at right angles to the tail-plate, I obviate these disadvantages, and allow said tail-plate to be sprung in between the raised part of the plate A and the spring B. I am also thus enabled to extend my spring laterally, so that it cannot possibly work loose.

What I claim as new and of my invention is as follows:

The cap-plate D of a pocket-book fastener, provided with hooks $d^2$ $d^2$ on edges of the tail thereof, and at right angles thereto, but not extending laterally beyond said edges, allowing the tail to be sprung in between the plate A and spring B, as shown and described.

LOUIS PRAHAR.

Witnesses:
JAMES T. GRAHAM,
C. SEDGWICK.